(No Model.)
G. A. GRAY, Jr.
ENGINE LATHE.
No. 252,760. Patented Jan. 24, 1882.
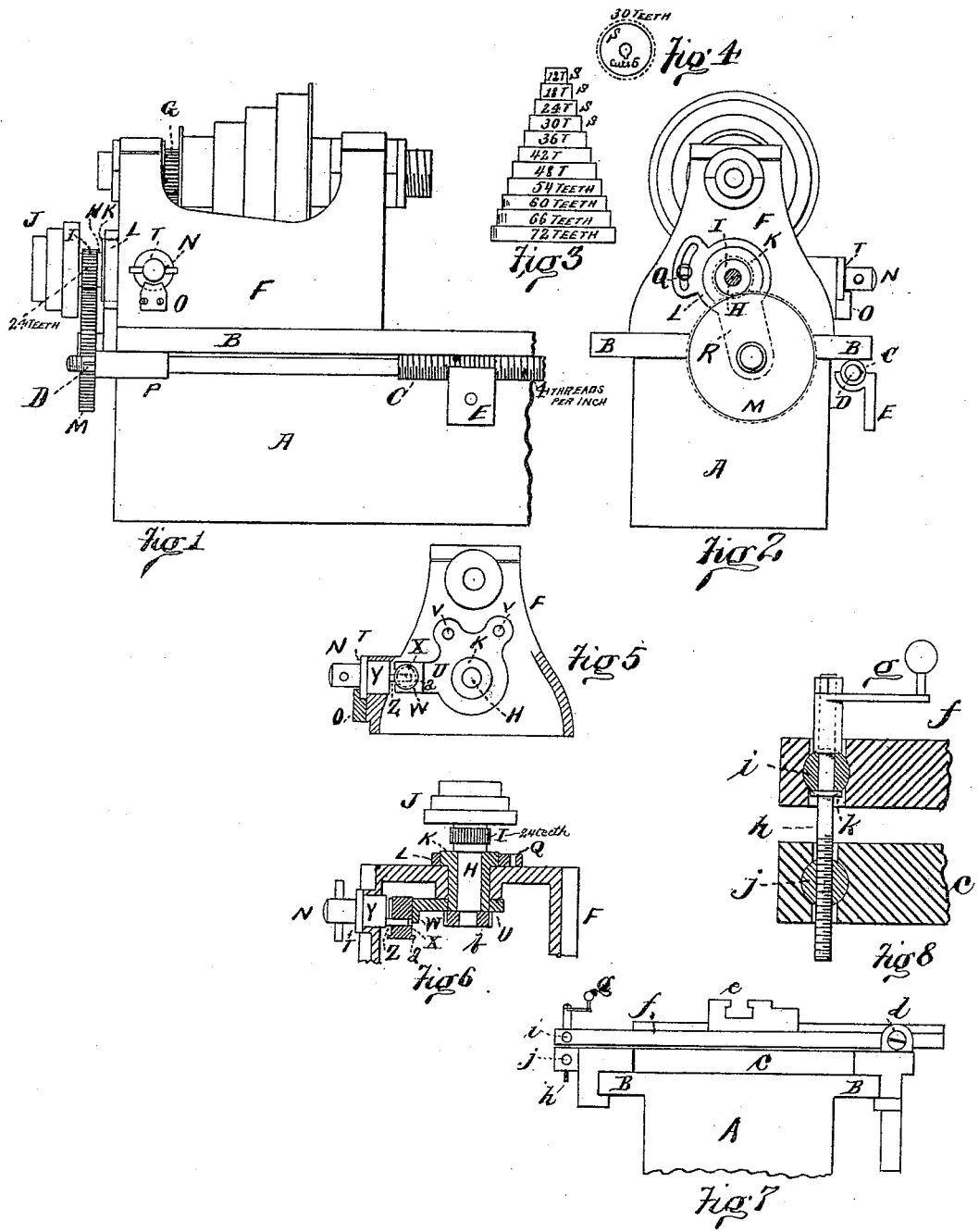

UNITED STATES PATENT OFFICE.

GEORGE A. GRAY, JR., OF COVINGTON, KENTUCKY, ASSIGNOR TO GEORGE A. GRAY, JR., & CO., OF CINCINNATI, OHIO.

ENGINE-LATHE.

SPECIFICATION forming part of Letters Patent No. 252,760, dated January 24, 1882.

Application filed August 30, 1881. (No model.)

*To all whom it may concern:*

Be it known that I, GEORGE A. GRAY, Jr., of Covington, Kenton county, Kentucky, have invented certain new and useful Improvements in Engine-Lathes, of which the following is a specification.

This invention pertains to ordinary screw-cutting engine-lathes, and relates to an improved arrangement of the lead-screw, whereby it is relieved from much ordinary wear and brought close to the line of strain; to an improved arrangement of change-gear devices, whereby a single gear-change effects the proper change in chasing screws; to an improved arrangement of the reversing mechanism which changes the direction of feed, and to an improved arrangement of bearing and nut for the elevating-screw of the tilting rest.

In the accompanying drawings, Figure 1 is a side elevation of the head-stock end of my improved lathe; Fig. 2, an end elevation of the same; Fig. 3, an elevation of the series of change-gears; Fig. 4, a face view of one of the change-gears; Fig. 5, a vertical section of the head-stock, showing tumbler, &c.; Fig. 6, a horizontal section of the same; Fig. 7, a side elevation of carriage with tilting rest, and Fig. 8 a vertical section of rear of same.

In Figs. 1 and 2, A is the bed, B its top flanges, and C the lead-screw.

E is the carriage-nut, which may be arranged to open and shut upon the lead-screw in any of the usual ways. It is a half-nut only, and bears upon the lower half of the lead-screw, as shown. The lead-screw, instead of having a half-bearing placed above the nut or a gutter, as usual, to keep it from springing away from the nut, is located directly under and in contact with the plain under surface of the flange B. This insures the screw being parallel with the bed, and brings it closer to the axis of the lathe than is common with lathes having outside screws, and also causes the nut when engaged to act as a gib to aid in binding the carriage to the bed and prevent its rocking. Most every other form of outside screw arrangement has a tendency to disturb the truth of the carriage movement and cause erratic motions of the cutting-tool.

P is the bearing for the lead-screw. The screw may be placed in front of the lathe, as shown, or at the back.

D is the end of the lead-screw, fitted as usual to receive change-gears for screw-cutting.

The series of change-gears are shown in Fig. 3, where the number of teeth is indicated. The increase throughout the series in the number of teeth in these gears S is constant, as shown.

In Figs. 1 and 2 is seen the usual "spindle" or "lathe-stud," as often termed, running in bearing K, fixed in the lathe-head. This stud H is driven, as usual, by a train of gearing inside or outside the head-stock, the motion originating with the arbor-gear G. On the stud H, outside the head-stock F, is fixed the pinion I, and outside this pinion is fixed the feed-cone J, if needed for driving a rod-feed.

R is an arm, whose hub L has a bearing upon the outside of the stud-bearing K, being adjustable around the same, and provided with slot and screw Q, for fastening when set. The idle-gear M is journaled in a fixed position on the arm R and gears with the pinion I, and may be made to mesh with any change-gear S, placed upon the end D of the lead-screw, in an obvious manner.

The lead-screw C in the drawings has four threads to the inch. The pinion I on the stud has twenty-four teeth. The constant increase in the number of teeth in the series of change-gears S is six teeth. The number of teeth in the pinion I is to equal the number of threads per inch on the lead-screw multiplied by the constant difference prevailing between the teeth of the change-gears S. Each one of the change-gears S thus becomes capable of yielding the proper screw motion, and the thread it will produce may be indicated upon the gear, as shown in Fig. 4.

The cam-handle N operates the usual reversing-tumbler, U, inside the head, and changes the direction of rotation of the stud H, thus changing the direction of feed, as usual. The tumbler U effects its functions as usual, and my invention relates to the means for operating it.

In Figs. 5 and 6, Y is the cam, having cam-pin Z.

W is a head upon the arm of the tumbler. It is bored to receive a sliding cylindrical plug, X, having a collar, $a$, which will contact with the head W when the plug is a certain distance in the head. A transverse hole in the plug X receives the cam-pin Z. When the cam is rotated the plug is reciprocated and moved vertically in an obvious manner, oscillating the tumbler as desired, and changing the direction of feed, as usual. The collar $a$ is so arranged as to contact with the tumbler U when the cam-pin Z is on either vertical center, and thus serves as a stop, limiting the rotation of the cam to a half-revolution with its terminations of rotation at its extreme points of vertical throw. The hole in the tumbler-head W, in which the cam-pin plug X fits, is open at the front to permit the pin Z to work. The rotation of the plug in its hole permits the cam-pin Z to have a nice fair bearing in the plug at all times.

The cam-body Y, which is journaled in the front of the head-stock F, has upon it a collar, T, which bears against the end of the cam-bearing, as shown. A clamp, O, bolted against the bearing of the cam, has a bearing against the outer face of the collar T, and is bolted up with sufficient tightness to secure friction enough on the collar to maintain the cam in position when thrown into its neutral position.

In Fig. 7, A is an end view of the lathe-bed. $c$ is the carriage; $f$, the upper part of the carriage or tilting rest, pivoted to the carriage at $d$. $e$ is the tool-block, and $g$ the screw-crank for adjusting the tail end of the rest $f$, all in the usual manner.

My invention here relates to the arrangement of the bearing and nut for the screw $h$. Across the tail of the rest $f$ and of the carriage $c$ suitable holes are bored, and in these holes are fitted cylinders $i$ and $j$. (Shown more plainly in section in Fig. 8.) The cylinder $j$ is tapped for the adjusting-screw $h$, and the upper cylinder, $i$, is bored and faced to serve as a bearing for the screw with its collar $k$ and crank $g$, as shown. As the rest $f$ is adjusted the rotation of the cylinders $i$ and $j$ permits the nut and bearing of the screw to remain in perfect line and work smoothly and freely while properly tight.

I claim as my invention the following improvements in engine-lathes:

1. The combination of bed A, having flange B projecting outward therefrom, carriage-nut E, fitted to engage with the under side of the lead-screw, and the lead-screw C, journaled under the flange B and contacting against the under side thereof, substantially as and for the purpose set forth.

2. The combination of lead-screw C, having gear fitting end D, series of change-gears S, having a constant difference in number of teeth, as specified, stud-bearing K, arm R L, fitted to be adjusted on and around said stud-bearing, idle-gear M, journaled in a fixed position to said arm, stud H, arranged to be revolved by the lathe, as usual, and pinion I, fixed on said stud, and having its number of teeth equal to the constant difference between the gears S multiplied by the number of threads per inch on the lead-screw C, all constructed and arranged to operate substantially as and for the purpose set forth.

3. The combination, with reverse tumbler U, and hand-cam N Y Z, of the sliding plug X, fitted to slide in the tumbler U, and having a transverse hole to serve as a bearing for the cam-pin Z, constructed and arranged to operate substantially as and for the purpose set forth.

4. The combination, with the reverse tumbler U and hand cam N Y Z, of the plug X, fitted to slide in the tumbler and to furnish a bearing for the cam-pin Z, and having collar $a$, or equivalent projection, arranged to contact with the tumbler and serve as a stop to the sliding motion of the plug, all constructed and arranged to operate substantially as set forth.

5. The combination, with the reversing-tumbler, of the cam-body Y, having handle N and collar T, of the bearing which supports the cam-body, and the clamp O, bolted to said bearing and fitted to clamp the collar T against said bearing, all constructed and arranged to operate substantially as and for the purpose set forth.

6. The combination, with the lathe-carriage $c$, tilting rest $f$, pivoted above the carriage $c$, and crank-screw $h$ $g$, for adjusting the tilting rest $f$, of the cylinders $i$ and $j$, fitted in said carriage and rest, and bored and tapped to serve as bearing and nut for the screw $h$, substantially as and for the purpose set forth.

GEORGE A. GRAY, JR.

Witnesses:
J. W. SIBBET,
WILLIS G. DURRELL.